United States Patent
Stükerjürgen

[11] Patent Number: 5,921,029
[45] Date of Patent: Jul. 13, 1999

[54] CLOSURE FLAP FOR STORAGE COMPARTMENTS AND METHODS OF MAKING SAME

[76] Inventor: Ferdinand Stükerjürgen, Grüner Weg 4, D-33397, Rietberg-Varensell, Germany

[21] Appl. No.: 08/821,432

[22] Filed: Mar. 21, 1997

[30] Foreign Application Priority Data

Apr. 3, 1996 [DE] Germany .................... 296 05 942 U
Jul. 1, 1996 [DE] Germany .................... 296 11 455 U

[51] Int. Cl.⁶ .................................................. E06B 3/00
[52] U.S. Cl. .................... 49/501; 296/37.12; 52/800.1
[58] Field of Search .................. 49/501; 296/37.8, 296/37.12, 901, 146.5; 52/784.1, 800.1

[56] References Cited

U.S. PATENT DOCUMENTS

| | | | |
|---|---|---|---|
| 4,427,215 | 1/1984 | Weichenrieder et al. | 296/37.12 X |
| 5,190,314 | 3/1993 | Takasugi | 296/37.12 X |
| 5,555,923 | 9/1996 | Leist et al. | 49/501 X |
| 5,778,598 | 7/1998 | Ohanesian | 49/74.1 |
| 5,800,005 | 9/1998 | Arold et al. | 296/37.12 |

*Primary Examiner*—Jerry Redman
*Attorney, Agent, or Firm*—Burns, Doane, Swecker & Mathis, L.L.P.

[57] ABSTRACT

A closure flap for a storage compartment, comprises an extruded segment having integral chambers disposed therein, and an injection-molded plastic cap attached to an open end of the segment to close-off that end. The end cap includes projections fitting into respective ones of the chambers. A threaded sleeve is secured within a recess of the segment and is adapted to receive a screw for attaching a hinge element to the segment. The flap is mounted to the storage compartment by means of the hinge element.

20 Claims, 5 Drawing Sheets

CLOSURE FLAP FOR STORAGE COMPARTMENTS AND METHODS OF MAKING SAME

BACKGROUND OF THE INVENTION

The invention concerns a closure flap or door for storage compartments, in particular for luggage compartments (e.g., overhead racks) made of plastic for landcraft, watercraft and aircraft.

Landcraft, watercraft and aircraft are provided with storage compartments, which are designed for storing various types of equipment, including overhead racks for storing hand luggage and outer wear items for passengers. Such storage compartments are, during travel, closed by doors or flaps, which securely prevent objects from falling out during the rough travel conditions. Such flaps comprise panels made from plastic, e.g., a honeycomb design used to ensure stability but which requires a considerable amount of material and work to make and install.

Such flap panels in general must be attached to existing inside structures by a hinge. One hinge component must be fixed to the inside structure and another hinge component fixed to the flap panel. It is difficult to fix a hinge component to the flap panel, owing to the conventional configuration of the flap panels. It is known to use dowels that are inserted from the back of the flap panel and are fixed through welding or gluing, which then hold the screws by which the hinges are attached. With this type of fastening, the dowels must be anchored to the back as well as the front of the flap in order to find sufficient hold. Alternatively, the flap panels can be provided with receiving pockets into which the hinge mountings are inserted which, in turn, contain the holders for the fastening screws, for example in the form of collets. It has now turned out that the hinge mountings with their holders for the fastening screws, which are inserted into receiving pockets are capable of withstanding the required stresses with certainty.

The object of the invention is to propose a cover flap, which is more economical and can be produced in a way that saves material and weight, and which meets the requirements of vehicle safety and thus can be safely used. In continuance of this object, a fastening insert for a fitting for such a flap is proposed, by which the above disadvantages are avoided and which can be produced easily as well as economically.

SUMMARY OF THE INVENTION

The object is achieved by forming the closure flap as an extruded segment having internal chambers. An injection-molded end cap is mounted to an open end of the segment to close-off that end. The end cap includes projections fitting into respective ones of the chambers.

By designing the cover flap panel as an extruded plastic segment with at least one injection-molded plastic end cap, the possibility is provided to extrude the segment as a multi-chamber profile of the form of a double-webbed strip which is endlessly produced and can be cut to the desired section lengths. The plastic segment of the desired length is then closed off at least on one side with a plastic end cap formed by an injection-molding technique. The other side can be covered with a plastic edge covering. It is advantageous if injection-molded plastic end caps are provided on both sides, which are then preferably formed as mirror images of each other. The open edges of the plastic segments (or possibly even the injection-molded plastic end caps) can be closed off with plastic edge coverings. In the case of two adjoining plastic segments, the common edges that border against each other and which are straight, are only covered with a plastic side covering.

Each of the plastic end caps has receptacles for the hinges that are necessary for the flap movement and attach it to the vehicle. For this, dowels are inserted into the segment, which are fixed in place through welding or gluing. These dowels then hold screws, with which the hinges are attached. Alternatively, the extruded profile segments are provided with receiving pockets, into which hinge mounting are inserted that are produced by the injection-molding method and which, in turn, hold the receptacles for the fastening screws, for example, in the form of the collets. Finally, it is possible to injection mold the end caps such that they have collets. By means of these collets and by fitting screws therethrough screw connections can be formed.

A locking mechanism is provided in order to enable the plastic closure flaps of the storage compartment to be opened by the user. For receiving this locking mechanism, the flap panel preferably has a pouch-like recess in the center. An injection-molded part can be inserted into this recess that forms the flap locking mechanism. The part includes a holding plate and lock bolt and can be fixed in place once inserted. Hereto, the injection-molded part is provided with suitable means that permit a fastening of the locking mechanism parts to the plastic flap panel.

In order to be able to join the plastic end cap and the plastic segment, both of them are formed such that they overlap in part, wherein the overlapping, planar parts are at different heights that are predetermined by the web height. With the plastic segment, this is achieved in that one of the side surfaces of the multi-chamber profile is cut down, i.e., for example through milling, so that only the other side surface with the webs remains. The injection-molded part is shaped such that the side surface that corresponds to the recessed side, is recessed back far enough so that after the joining, the recessed area is covered. The other side surface of the plastic end cap is formed such that it abuts dully against the side surface of the plastic flap panel that is not recessed. In this case, the distance between the two side surfaces corresponds to the web height. Even the plastic end caps are provided advantageously with stiffening webs at a right angle to the side panel surfaces, which are arranged such that they correspond to the webs of the plastic flap panel so that they fit against these after the joining.

In order to increase the stability, in particular against bending or twisting, the upper or lower side panes of the plastic flap panels are shaped such that at a distance to the end edge of the pane they have a reinforcement that runs crosswise to the web direction and takes the shape of an inserted web or an imprinted groove. For this, the upper and underside of the extruded profile segment, including the webs, is provided with a groove into which the reinforcement web that runs crosswise is welded or glued. Alternatively, a groove is pressed into the back panel of the extruded profile segment-by warming up the material-wherein the material for the webs of the extruded profile is displaced in the area of the groove. This reinforcement causes a considerable stiffening of the multi-chamber profile, especially near the end areas.

It is advantageous if one of the side surfaces of the plastic end cap is provided with tongues, which are arranged such that during the joining operation, they can be inserted into at least some of the hollow chambers of the extruded and recessed plastic flap panel and can be fixed in place there. These tongues increase the stability of the connection, so that even with higher requirements and a rough operation, the security of the flap locking mechanism is ensured.

In order to join the plastic flap panel to the plastic end cap, the places of contact between plastic end cap and flap panel are welded together. This welding is done here with the welding techniques known from the plastic technology. Alternatively, the places of contact between plastic end cap and flap panel are glued. For this as well, suitable adhesives are known for (nearly) all plastics. It is understood here that type and production of the connection are made such that these correspond to the requirements, in particular the safety requirements.

In order to be able to comply with the safety requirements, especially for aircraft, it is advantageous if an amorphous thermoplast is used as plastic material for extrusion and injection-molding, such as for example poly-estheremides. Plastic materials on this basis can be processed either through extrusion or injection molding. While easy to process, they are fireproof and cause little smoke in case of a fire. These plastics can also be reinforced with fibers (glass, carbon) to increase their stiffness and dimensional stability. The flaps designed in this way are also distinguished through an excellent acoustic behavior with respect to acoustic reflections as well as structure-borne conductance, so that the noise level can be lowered with these flaps.

A trough-shaped fastening insert is fitted into the receiving opening that is located either in the lower panel or the upper panel. This design provides a fastening option that can be inserted in a simple way for the installation of a hinge in a double-web type extrusion profile. The only thing needed for this is an opening in the lower or the upper side panel.

It is advantageous if the hinge mounting is shaped as an essentially rectangular insert, the height of which approximately corresponds to the height of the longitudinal webs. This height makes it possible for the insert to support itself on the other panel. The receptacle opening here corresponds to the shape of the insert, so that at least in the area of the upper edge of the trough, a form-closure is possible. In an analogous way, the hinge mounting can also be produced with a round cross-section.

The hinge mounting is preferably designed such that it can be produced by injection molding. This design permits an adaptation to the plastics of the extrusion profile, as well as a simplified and thus cost-effective production. Locking means are provided on the inside of the trough for the hinge mounting, which interact with locking nubs at the fastening insert in such a way that the fastening insert is secured once it is fitted into the trough. This permits locking the fastening insert into place during the installation in a simple way.

One advantageous alternative embodiment provides that an injection-molded pin contains the fastening insert, i.e., the pin injection-molded around the insert. For this, the fastening insert is placed into the injection-molding form and is sprayed over after the form is closed. The fastening insert is then covered by plastic material flowing around it and it fixed in the pin. With this method, the plastic insert for the hollow-chamber profile is produced in a simple manner. The latching segments that hold the fastening insert by gripping it from the back can be dispensed with. Their function is taken over by the receiving sleeve that forms when the injection material flows around.

In one preferred embodiment, the hinge mounting is fixed in the extrusion profile by means of a hardened casting resin or adhesive. It is preferably if the fastening insert that is prefixed in the trough for the hinge mounting through latching is also fixed with a casting compound, preferably a hardened casting resin or adhesive. A two-component epoxy resin, for example, is provided as casting resin in both cases.

The fastening insert is an insert with a borehole that holds a locking dowel, wherein locking dowels are provided as fastening means of the hinge. It is advantageous here if the locking dowels are designed as straddling dowels, which—in another modification—are formed as part of the side area of the hinge made from plastics. With the intended locking mechanism with spreading dowels, the installation is made very simple. The connection is achieved through simple fitting together. A blow to the spreading dowel secures it.

Alternatively, an insert with a threaded borehole holding a screw is provided as fastening insert, wherein screws are provided as fastening means on the hinge. For another modification, an insert with a bayonet receptacle for holding a bayonet locking mechanism is provided as insert, wherein bayonet locking mechanisms are provided as fastening means on the hinge. The screw and bayonet fastenings constitute connections that can be released again in a simple manner. This is of particular importance if, for example, for regular inspections, the dismantling of the flaps for maintenance purposes during maintenance intervals should be necessary.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 4 is an exploded top plan view of the embodiment of FIG. 1a;

DETAILED DESCRIPTION OF PREFERRED EMBODIMENTS OF THE INVENTION

Figure 1A:
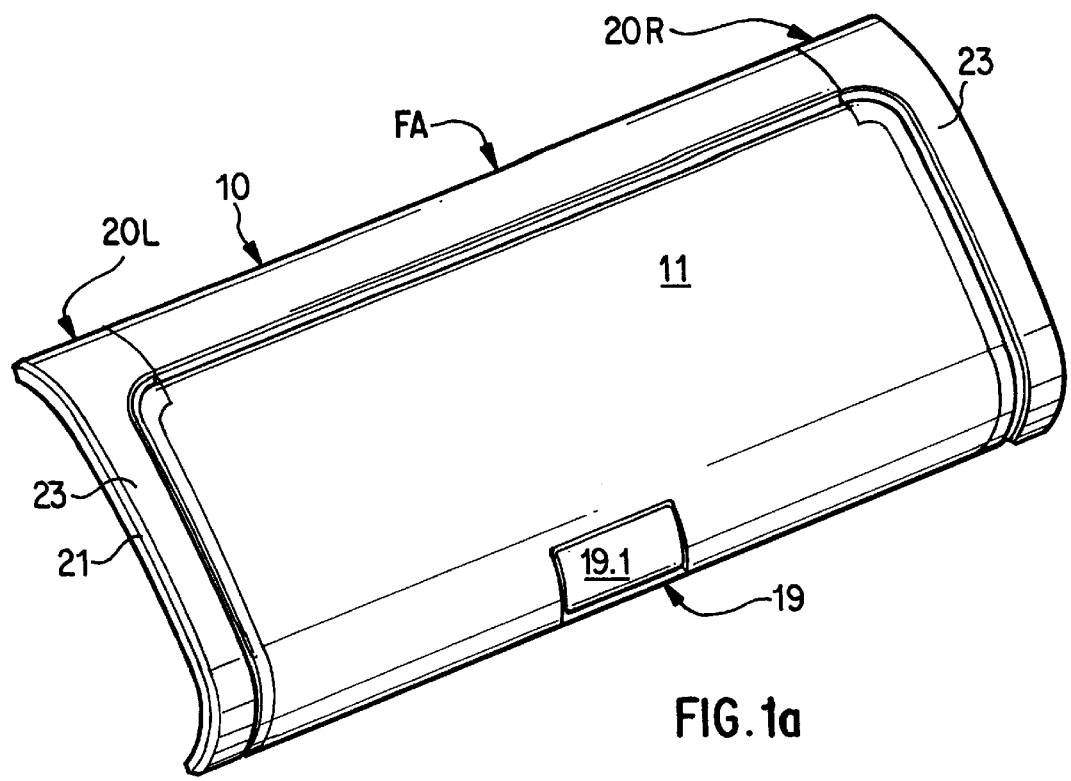
FIG. 1a is a top perspective view of a closure flap or panel according to one embodiment of the invention.
Figure 1B:
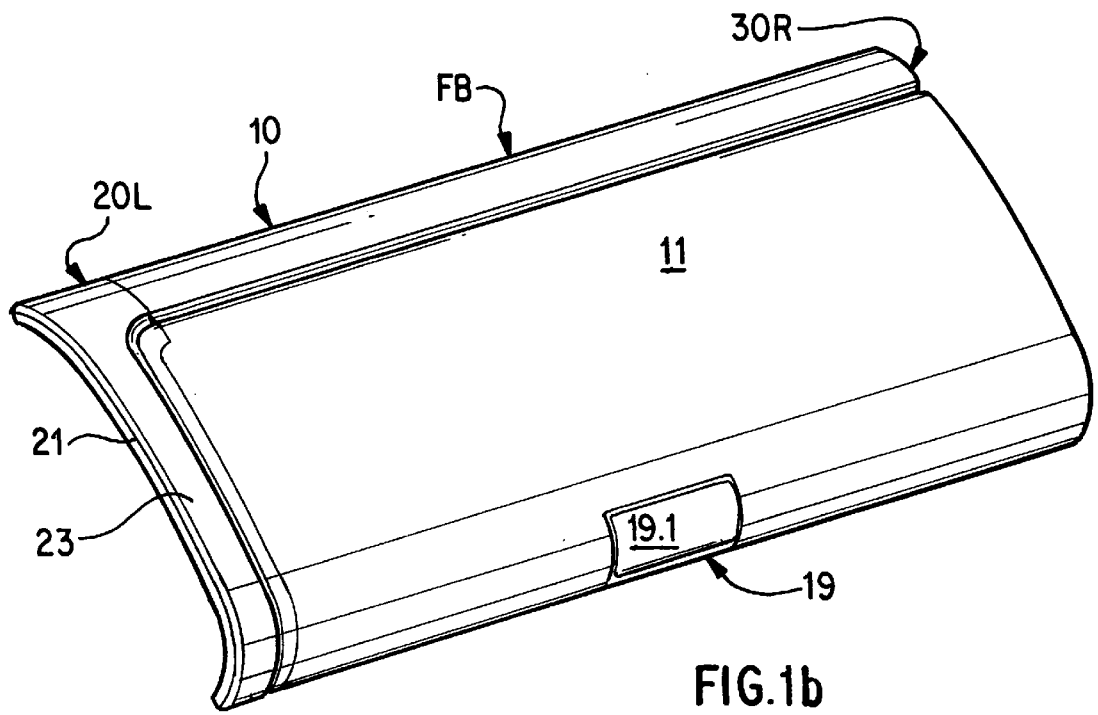
FIG. 1b is a view similar to FIG. 1a, of another embodiment.
Figure 1C:
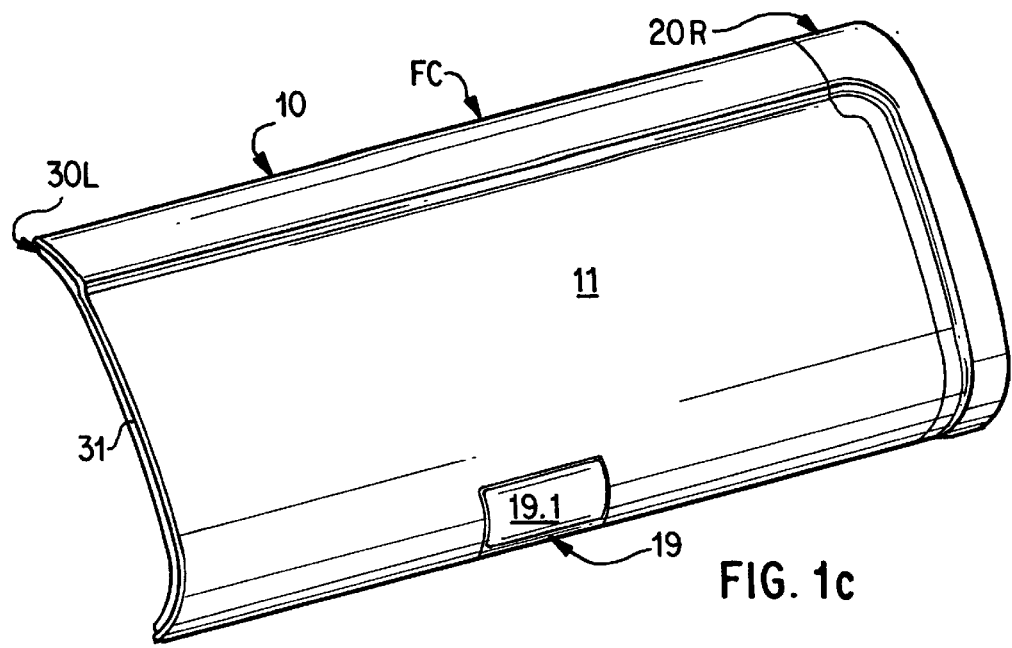
FIG. 1c is a view similar to FIG. 1a of still another embodiment.
Figure 3:
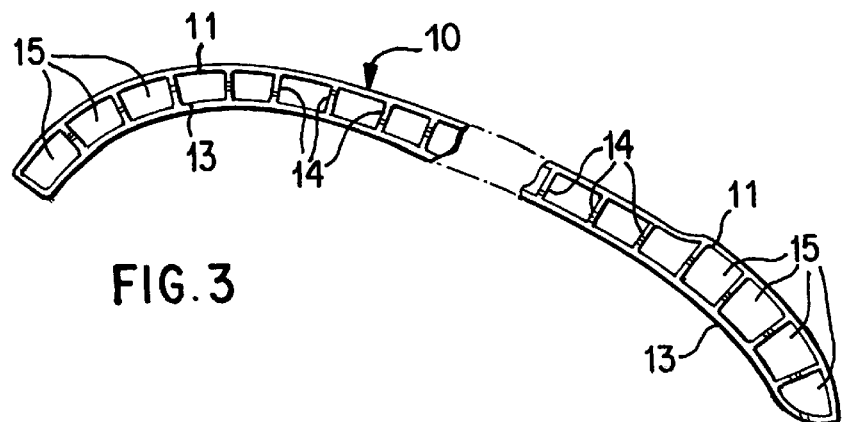
FIG. 3 is an end view of a segment used in making the embodiments of FIGS. 1a–1c.

FIGS. 1a–1c depict respective embodiments of cover flaps with different designs for an overhead rack or compartment in an airplane. Each embodiment is made by forming a member 10 by an extrusion process, the extrusion comprising upper and lower panels 11, 13 interconnected by webs 14 to form internal web chambers 15, as shown for example in FIG. 3. The extrusion is performed in a direction perpendicular to the plane of the paper on which FIG. 3 is drawn. In particular a long strip is extruded, and the strip is then cut into segments of desired lengths to form the members 10. Such a structure is economical, light-weight, and highly stable (i.e., stress resistant).

Figure 2:
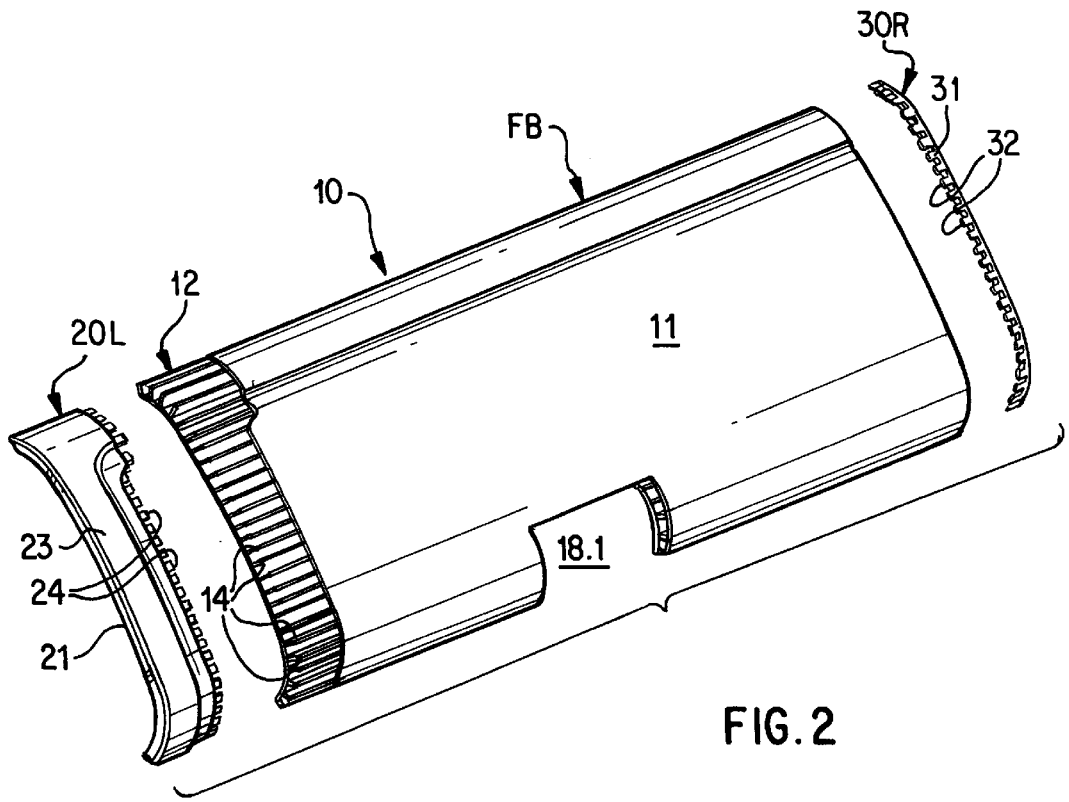
FIG. 2 is an exploded top perspective view of the closure flap depicted in FIG. 1b.

The embodiment of the flap FB according to FIG. 1b is formed by removing (e.g. by milling-away) a portion of the upper panel 11 along a left edge thereof to define a recess 12 of that edge, as shown in FIG. 2. An injection-molded end cap 206 is mounted along that edge, and an edge covering 30R is mounted along the right edge. Hereinafter, the member 10 will be referred to as a center section. For the embodiment according to FIG. 1a, the cover flap FA is designed such that two end caps 20L, 20R (shaped as mirror images of one another) are attached to recesses formed at respective open ends of the center segment 10, and such, that approximately in the middle of the center segment 10, a fastening device 19 is provided, the handle 19.1 of which is visible. FIG. 1c shows an embodiment of a cover flap FC where, like the flap FB, only one end cap (here, a right flap 20R) is attached to the center segment 10.

As indicated earlier, FIG. 2 indicates (schematically) the production steps for the cover flap FB. Initially, the extruded multi-chamber profile is cut to form the center segment 10 in a length that conforms to the desired cover flap length, taking into consideration the dimension of the end cap 20L that is to be attached. In the range where the end cap 20L to be attached, the upper panel 11 must be recessed at 12 as far as the upper side walls 23 of the end cap 20L extends. This can be achieved by milling-away part of the upper panel 11. The webs 14 (and the chambers 15 that are positioned between the webs) of the multi-chamber profile are thus exposed, and the lower panel 13 becomes visible. In addition to this recessed area 12 on the upper panel 11, another recess 18.1 is provided, into which the fastening device 19 with handle 19.1 (FIG. 1) can be inserted. Following that, the end cap 20L is attached. This end cap 20 has tongues 24 in the area of the rib-like webs 14 of the center segment 10. These tongues engage in the web chambers 15 and are fixed there after insertion, by gluing or welding.

Figure 4:
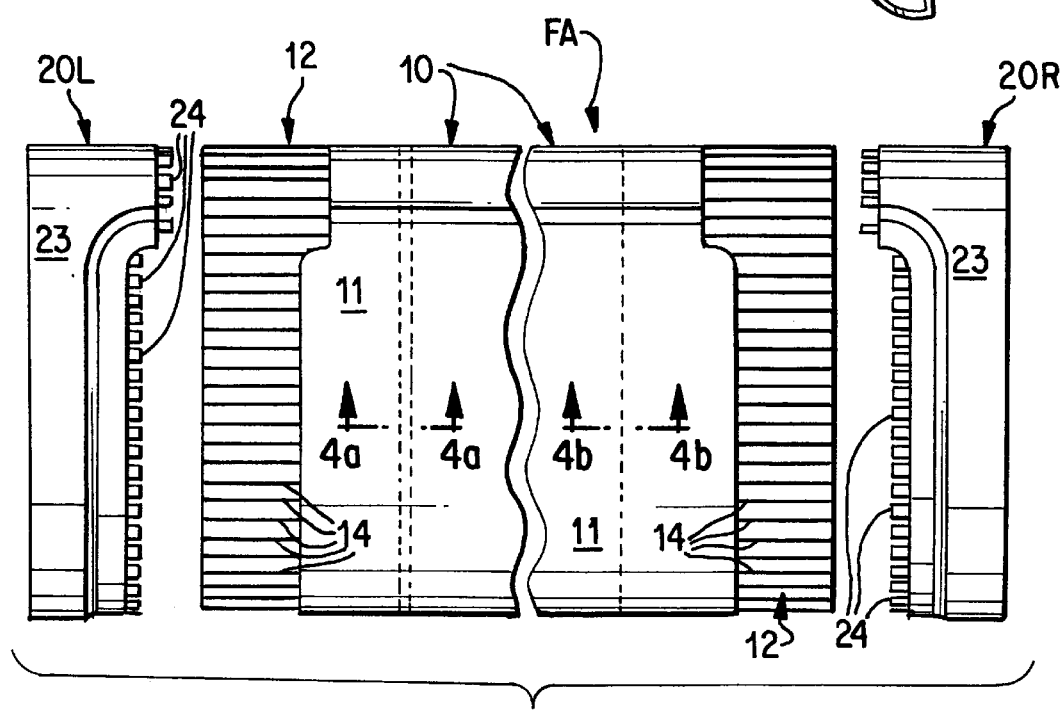
Figure 4A:
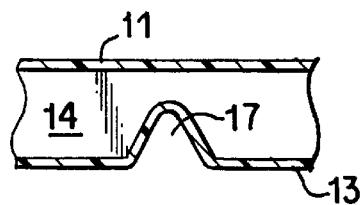
FIG. 4a is a cross sectional view, taken along the line 4a—4a in FIG. 4.
Figure 4B:
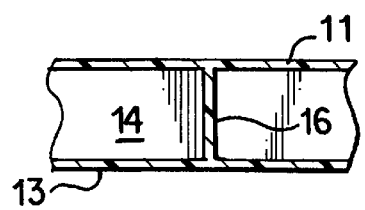
FIG. 4b is a cross sectional view taken along the line 4b—4b in FIG. 4.

As shown in FIGS. 1a and 4, both ends of the extruded center segment 10 can be provided with end caps 20R, 20L. If one of the open ends of the extruded center segment 10 is equipped with an edge covering 30L or 30R, (also formed by extrusion), then this covering with its tongues 32 is also inserted into the web chambers 15 of the center segment 10 and fixed in place there the same way as the end cap 20L or 20R. The side wall 31 of the edge covering closes the open side of the center segment 10. It is understood that the end cap 20L or 20R can also have an open side. If this is the case, then this open side is also closed off by such an edge covering 30L or 30R. The end caps 20L, 20R as well as the edge coverings 30L, 30R are, if necessary, injection-molded as a left- or right-handed design.

The flap FA comprised of two end caps 20R, 20L and the center segment 10 is shown in FIG. 4, in a view from above. In this case, the upper side walls 23 of the end caps 20L, 20R span the exposed webs 14 in the recessed areas 12 of the center segment 10, while the tongues 24 of the end caps are inserted into the web chambers 15. This results in a "virtual intermeshing." The exposed webs 14 of the multi-chamber profile of the center segment 10 here support the upper side wall 23 of each end cap, which is thus rigidly connected to the center segment 10. Edge coverings 30L, 30R would be inserted to complete the design of the edge locking mechanism, if the end caps had open sides. Finally, the fastening device 19 (FIG. 1) is inserted into the recessed chamber 18.1 and is fixed in place there. Accordingly, the flap is completed enough so that after applying a respective finish, it is only necessary to attach the locking mechanism and the hinges in order to be able to install the cover flap. The hinges will be described later herein. If further reinforcement is needed, then reinforcing webs 16 are inserted, or reinforcing grooves 17 are formed (preferably symmetrical to the center) in the extruded center segment 10, perpendicular to the webs 14 of the extruded profile. In order to insert the reinforcement webs 16, the lower panel 13, including the webs 14, are slotted, so that the reinforcement webs 16 can be slid-in and welded or glued in place. In order to form a reinforcement groove 17, the lower panel 13 is deformed into a groove after being heated, wherein the material of the webs 14 for the extruded profile is also displaced to form parts of the groove.

Figure 5:
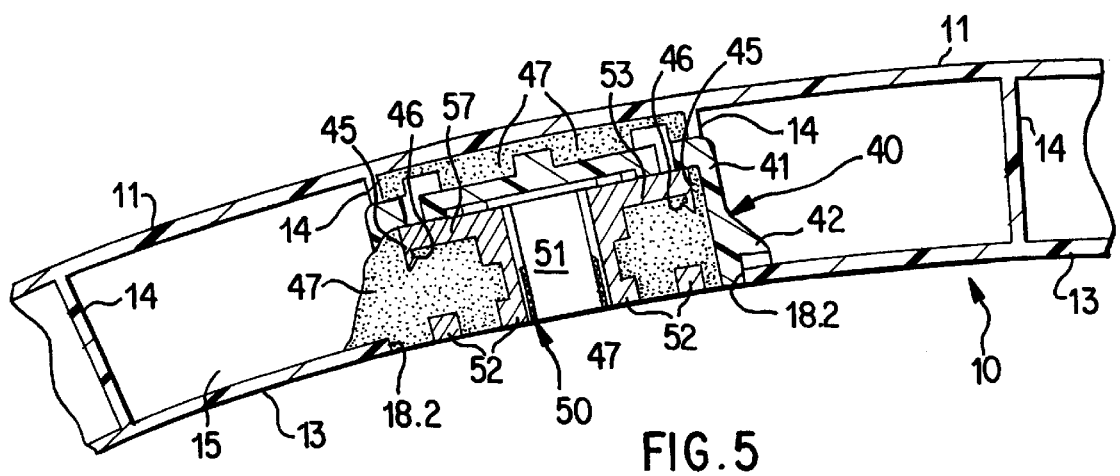
FIG. 5 is a cross sectional view through a closure flap showing a mounting structure thereof to which a hinge can be secured.
Figure 6:
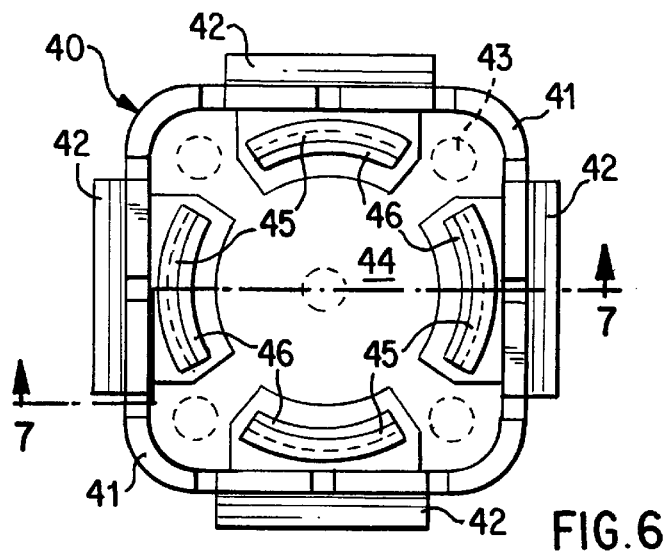
FIG. 6 is a bottom plan view of a dowel element prior to being inserted into a closure flap.
Figure 7:
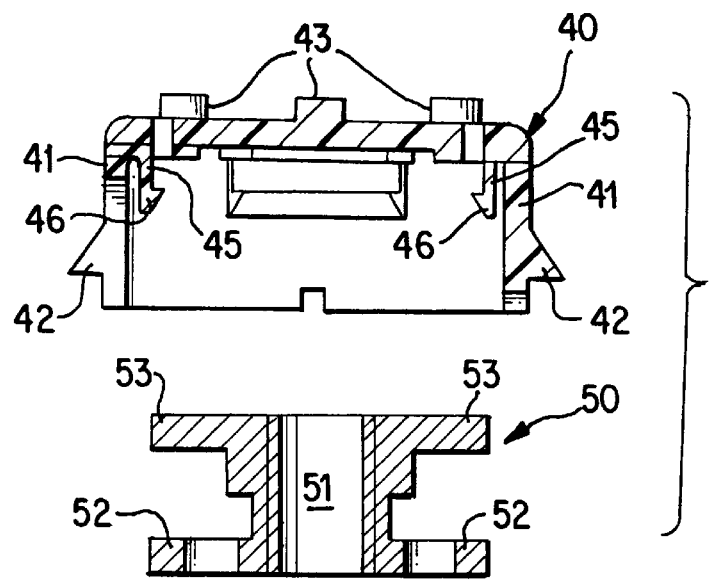
FIG. 7 is an exploded sectional view of one embodiment of a dowel and insert which comprise snap-together parts.

It may be desirable to attach an element, such as a hinge 60, to the flap FA, FB, or FC. Accordingly, an internally threaded insert 50 is mounted in the center section 10 as shown in FIGS. 5–7, for receiving a fastener, such as an externally threaded screw fastener. The insert 50 would thus have an internal screw thread 51, and would be mounted in a dowel 40 which is, in turn secured within a recess 18.2 formed in the lower panel 13 (or alternatively in the upper panel 11). The dowel 40 is preferably formed of plastic, and the insert 50 is usually metal. The recess 18.2 is large enough so that a base body 41 of the dowel 40 can be pushed therethrough, to enable outer latching nubs 42 of the body 41 to lock in place behind the lower panel 13, and thus temporarily secure the dowel 40. The fastening insert 50 has a lower collar 53, which is inserted into a receptacle ring (FIG. 6) comprised of latching segments 45 having latching nubs 46 which grip the collar 53. Finally, the dowel 40 and insert 50 are permanently fixed in place in the center segment 10 by a hardening casting compound or a hardening adhesive 47, wherein an outer collar 52 of the insert 50 serves to close the recess 18.2 and lies flush with the outer side of the panel 13. The thread 51 can be accessed from the outside, so that the hinge 60 can be attached by a fastening screw. Of course, the insert 50 need not comprise a threaded element; other structures are possible.

The dowel 40 itself is shown in more detail in FIGS. 6 and 7, wherein FIG. 7 shows a section along line 7—7 in FIG. 6. The essentially cubical base body 41 with a rectangular cross section, the dimensions of which correspond to those of the recess 18.2 has the outer latching nubs 42 that project from all four sides and which are used to fix the dowel 40 in the recess 18.2, at least temporarily (alternatively, the base body will be of cylindrical shape). Base nubs 43 project upwardly on the basic body 41, wherein the height of the basic body 41 with the nubs 43 essentially corresponds to the depth of the chamber 15 of the center segment 10. Inside the dowel is the receptacle 44, formed by the latching segments 45 (four latching segments in the representation for FIG. 6, wherein this number is not limited to the four shown here and depends on the design of the dowel 40 as well as the insert 50). The latching nubs 46 overlap the lower collar 53 of the insert 50 (FIG. 5) and hold it in its position. FIG. 7 furthermore shows the fastening insert 50 in the uninserted state. This insert comprises a central part having the thread 51, the lower collar 53, and an upper collar 52, wherein the upper collar 52 has openings (not explained in more detail).

Figure 5A:
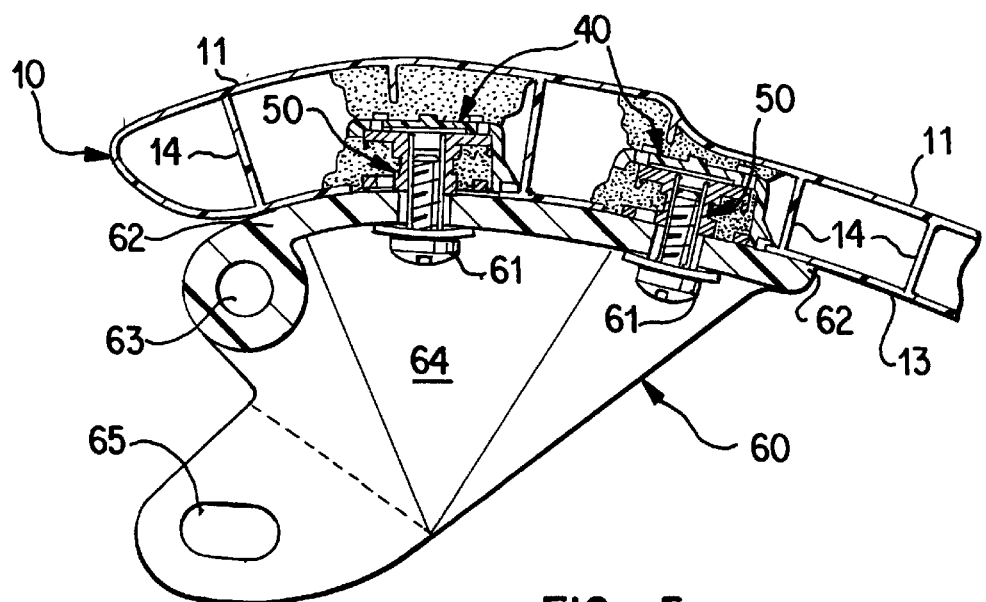
FIG. 5a is a sectional view through a flap panel showing two of the mounting structures of FIG. 5, and a hinge secured thereto.

Each hinge element 60 is attached to a plurality of the fastening inserts 50, by means of screws 61, as shown in FIG. 5a. The hinge element 60 includes a base plate 62, and the base plate 62 forms an eye 63 which will be pivotably mounted to a frame by means of a hinge pin (not shown). The hinge element 60 further includes a bracket 64 having a slot 65 formed therein. The slot 65 is adapted to be attached to the end of a conventional gas pressure spring (not shown) which regulates the speed with which the door is opened.

Figure 8:
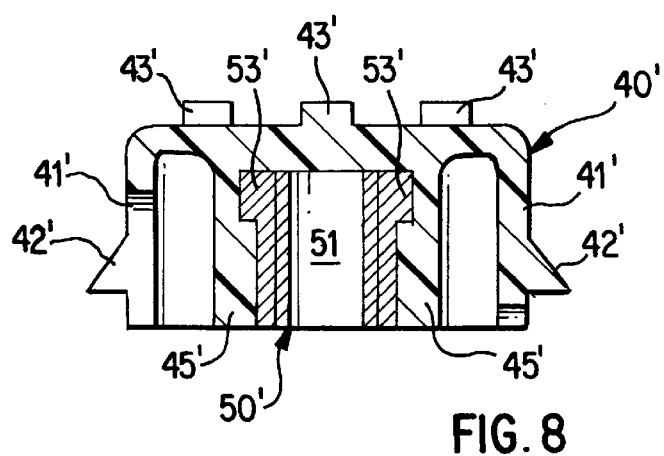
FIG. 8 is a vertical sectional view of another embodiment of the dowel and insert wherein those parts are integrally molded together.

FIG. 8 shows another form of dowel 40' that can be inserted into the center segment 10. The parts of the dowel 40' which correspond to those of the earlier-described dowel 40 are given the same reference numerals, together with a prime symbol. This dowel 40' is injection-molded from plastic material as one piece, wherein the fastening insert 50' is inserted into the injection-molding form so that plastic material flows around it during the molding process, which fixes it to the thus-formed dowel 40'. This dowel 40' corresponds in its outer form to that shown in FIGS. 6 and 7 and can be inserted without problems in place of one of the dowels 40. With its lugs 42' the dowel 40' grips behind the panel 13, wherein its base nubs 43' come to rest approximately against the panel 13. In lieu of latching segments 45, there is here provided a sleeve 45', corresponding to the method of production in the injection-molding process—which retains the fastening insert 50'. The fastening insert 50' itself only has a lower collar 53', since an upper collar is not necessary for this design. For the production process, the fastening insert 50' is inserted into the injection-molding form prior to the molding. The form is then closed, which is followed by the injection shot during which plastic material flows around the fastening insert 50'. After being removed, the dowel 40' is ready for use.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A closure flap for storage compartments, comprising an extruded plastic segment having internal chamber, an injection-molded plastic end cap mounted to at least one open end of the extruded segment, the end cap including projections fitting into respective ones of the chambers of the segment, and a hinge element fastened to the extruded segment, the extruded segment including upper and lower panels, a recess formed in one of the panels, and an insert mounted in the recess, the insert including an internal screw thread adapted to receive a fastener for securing the hinge element to the extruded segment.

2. The flap according to claim 1 wherein two of the injection-molded end caps are mounted in respective opposite open ends of the segments.

3. The flap according to claim 2 wherein the end caps are designed as mirror images of one another.

4. The flap according to claim 1 wherein the upper and lower panels a separated by webs, a portion of one of the panels being removed to expose portions of the webs, the end cap covering those web portions.

5. The flap according to claim 4 wherein an end of the extruded segment disposed opposite the end cap is closed by an edge covering, the edge covering having projections fitted into respective chambers of the segment.

6. The flap according to claim 4 wherein another portion of the one panel is removed and is closed by another end cap.

7. The flap according to claim 4 wherein an edge of the end cap facing away from the extruded segment is closed by an edge covering.

8. The flap according to claim 4, further including a reinforcing web disposed between the upper and lower panels and extending laterally relative to the webs.

9. The flap according to claim 1 wherein one of the panels is recessed to form a reinforcing groove.

10. The flap according to claim 1, wherein the end cap is welded to the segment.

11. The flap according to claim 1, wherein the end cap is glued to the segment.

12. The flap according to claim 1, wherein the extruded segment is formed of an amorphous thermoplast.

13. The flap according to claim 1, wherein the end cap is formed of an amorphous thermoplast.

14. The flap according to claim 1, further including a dowel mounted in the recess, the insert mounted in the dowel.

15. The flap according to claim 14, wherein the dowel has a height corresponding to a distance between the upper and lower panels.

16. The flap according to claim 15, wherein the dowel has a generally rectangular cross section.

17. The flap according to claim 15, wherein the dowel has a generally circular cross section.

18. The flap according to claim 14 wherein the dowel includes latching nubs engaging positions of the insert to retain the insert.

19. The flap according to claim 18, wherein there are a plurality of latching nubs forming a ring into which the insert extends.

20. The flap according to claim 14, wherein the dowel is bonded to the extruded segment.

\* \* \* \* \*